United States Patent
Connell, II et al.

(10) Patent No.: US 10,685,172 B2
(45) Date of Patent: Jun. 16, 2020

(54) GENERATING A TEXTUAL DESCRIPTION OF AN IMAGE USING DOMAIN-INDEPENDENT ANOMALY ANALYSIS

(71) Applicant: International Business Machines Corporation, Armonk, NY (US)

(72) Inventors: Jonathan H. Connell, II, Cortlandt-Manor, NY (US); Sharathchandra Pankanti, Fairfield County, CT (US); John R. Smith, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

(21) Appl. No.: 15/989,153

(22) Filed: May 24, 2018

(65) Prior Publication Data
US 2019/0361965 A1    Nov. 28, 2019

(51) Int. Cl.
*G06F 40/169* (2020.01)
*G06T 7/00* (2017.01)
(Continued)

(52) U.S. Cl.
CPC ........ *G06F 40/169* (2020.01); *G06F 16/5866* (2019.01); *G06K 9/628* (2013.01);
(Continued)

(58) Field of Classification Search
CPC ...... G06F 17/241; G06F 16/5866; G06T 7/11; G06T 7/0014; G06T 2207/10081;
(Continued)

(56) References Cited

U.S. PATENT DOCUMENTS

| 8,798,965 B2 | 8/2014 | Quan et al. |
| 2007/0078873 A1 | 4/2007 | Avinash et al. |

(Continued)

FOREIGN PATENT DOCUMENTS

| CN | 102027490 A | 4/2011 |
| CN | 102053963 A | 5/2011 |

(Continued)

OTHER PUBLICATIONS

International Search Authority, International Search Report and Written Opinion, PCT/IB2019/053915, dated Sep. 5, 2019.
(Continued)

*Primary Examiner* — Lewis G West
(74) *Attorney, Agent, or Firm* — Garg Law Firm, PLLC; Rakesh Garg; Anthony Curro (57) ABSTRACT

Generating a textual description of an image includes classifying an image represented by image data into a domain-specific category, and segmenting one or more elements in the image data based on the domain-specific category. Each element of the one or more elements is compared to a domain-independent model to detect one or more statistical anomalies in the one or more elements. The one or more detected statistical anomalies are characterized using one or more domain-independent text phrases. The one or more domain-independent text phrases are converted to one or more domain-specific descriptions based upon the domain-specific category.

20 Claims, 8 Drawing Sheets

(51) Int. Cl.
*G06T 7/11* (2017.01)
*G06K 9/62* (2006.01)
*G06F 16/58* (2019.01)

(52) U.S. Cl.
CPC .............. *G06T 7/0014* (2013.01); *G06T 7/11* (2017.01); *G06T 2207/10081* (2013.01); *G06T 2207/30048* (2013.01); *G06T 2207/30061* (2013.01); *G06T 2207/30101* (2013.01)

(58) Field of Classification Search
CPC . G06T 2207/30061; G06T 2207/30048; G06T 2207/30101; G06K 9/628
See application file for complete search history.

(56) References Cited

U.S. PATENT DOCUMENTS

| | | | | |
|---|---|---|---|---|
| 2008/0205716 | A1* | 8/2008 | Von Berg | G06T 7/12 382/128 |
| 2010/0020066 | A1* | 1/2010 | Dammann | G06T 19/00 345/419 |
| 2014/0029832 | A1* | 1/2014 | Molnar | G06T 7/194 382/132 |
| 2014/0270497 | A1 | 9/2014 | Kannan et al. | |
| 2018/0060488 | A1* | 3/2018 | Reicher | G06F 17/241 |
| 2019/0183366 | A1* | 6/2019 | Dehghan Marvast | G06T 7/0014 |
| 2019/0188852 | A1* | 6/2019 | Reicher | G06N 5/02 |

FOREIGN PATENT DOCUMENTS

| | | |
|---|---|---|
| CN | 104063685 AB | 9/2014 |
| CN | 102938054 B | 7/2015 |
| IN | 240122 AB | 4/2010 |
| WO | 0141064 A2 | 7/2001 |
| WO | 2013018363 A1 | 7/2013 |

OTHER PUBLICATIONS

Li, S., Kulkarni, G., Berg, T. L., et al. (2011). Composing simple image descriptions using web-scale n-grams. Proceedings of the Fifteenth Conference on Computational Natural Language Learning, 220-228.

Crandall, D. J., Backstrom, L., Huttenlocher, D., et al. (2009). Mapping the world's photos. Proceedings of the 18th international conference on World wide web, 761-770.

* cited by examiner

GENERATING A TEXTUAL DESCRIPTION OF AN IMAGE USING DOMAIN-INDEPENDENT ANOMALY ANALYSIS

TECHNICAL FIELD

The present invention relates generally to a method, system, and computer program product for generating a textual description of an image. More particularly, the present invention relates to a method, system, and computer program product for generating a textual description of an image using domain-independent anomaly analysis.

BACKGROUND

A number of artificial intelligence based reasoning systems exist for analyzing text-based or semantic network-based representations of data to extract desired information from the data such as determining an answer to a question pertaining to a given subject-matter associated with the data. These reasoning systems typically include an application executing on data processing hardware. Sometimes problems posed to such systems have an image component as well. For example, some questions from medical licensing exams include annotated anatomy diagrams or radiology images. Unfortunately, no straightforward way exists to convert these semantic-based (e.g., language-based) networks to provide the reasoning system with the capability to analyze the image data as well as the textual data to determine an answer to extract desired information such as answering a question pertaining to the textual data and image data. Accordingly, existing reasoning systems often ignore these images despite their obvious utility for answering the question.

SUMMARY

The illustrative embodiments provide a method, system, and computer program product. An embodiment of a method for generating a textual description of an image includes classifying an image represented by image data into a domain-specific category, and segmenting one or more elements in the image data based on the domain-specific category. The embodiment further includes comparing each element of the one or more elements to a domain-independent model to detect one or more statistical anomalies in the one or more elements, and characterizing the one or more detected statistical anomalies using one or more domain-independent text phrases. The embodiment further includes converting the one or more domain-independent text phrases to one or more domain-specific descriptions based upon the domain-specific category.

An embodiment further includes outputting the one or more domain-specific descriptions. Another embodiment further includes receiving the image data, and receiving context information indicative of a context of the image data. In the embodiment, the classifying of the image into the domain-specific category is based upon the context information. In another embodiment, the context information includes metadata associated with the image data. In another embodiment, the context includes a modality and viewpoint of the image data.

In another embodiment, segmenting the one or more elements uses a segmenting procedure specific to the domain-specific category. In another embodiment, segmenting the one or more elements uses a segmenting procedure specific to the element. In still another embodiment, segmenting the one or more elements aligns a generically segmented element with a coarse model associated with the domain-specific category.

In another embodiment, the domain-independent model is a contour-based shape model. In another embodiment, the domain-independent model is a texture-based interior model.

In another embodiment, characterizing the detected statistical anomalies includes noting missing or under-represented elements. In another embodiment, characterizing the detected statistical anomalies includes noting extra or over-represented elements.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments described herein generally relate to generating a textual description of an image using domain-independent anomaly analysis. The illustrative embodiments recognize that presently available tools or solutions for generating a textual description of an image do not address these needs or provide solutions for these needs.

One existing approach for generating a textual description for an image is to recognize the image as a member of some scene class such as a "beach", "meadow", or "cityscape". Weaker versions of such processes exist which only attempt a partial description of an image such as "indoors" or "X-ray" which describe the environment more than the contents of the scene itself. While such partial descriptions are obviously better than treating the image data as a large "bag of bits", these partial descriptions are usually not specific enough to allow for intelligent reasoning.

Another existing approach for generating a textual description for an image is to characterize the image by the objects the image contains. Such characterization can be general characterizations such as "people" or "animals", or more specific characterizations such as "John Smith" and "Labradoodle". Unfortunately, specific models must be learned for each fine-grained class and thus such an approach requires a large amount of labeled training data and computation time.

Even listing objects may not be particularly helpful to some reasoning systems. For instance, indicating that a particular medical diagnosis is a "chest X-ray" and that it includes a "left lung", a "right lung", and the "heart" has little to no diagnostic value. For such systems even finer-grained concepts such as "lung nodule", "infarction", or "astroglioma" have to be trained. Thus, potentially a prohibitively large number of categories would be needed to describe medical images in general.

Existing specialized medical image analysis systems are available for various organs, conditions, and modalities such as cardiac blood flow, electrocardiogram (EKG), cell counting. However, these specialized systems require careful hand-coding of programs to be effective. In addition, machine learning systems exist for detection and/or diagnosis with respect to particular organs, conditions, or modalities such as melanoma, breast cancer, and diabetic retinopathy. However, these machine learning systems require many accurately labeled training examples. Further, deep learning image-to-text generation system exist that are primarily used for web photos, not medical imagery. However, these existing deep learning image-to-text generation systems require supervised training data.

The illustrative embodiments used to describe the invention generally address and solve the above-described problems and other problems related to generating a textual description of an image.

One or more embodiments described herein provide for an application that first classifies an image into certain broad categories. From the broad categories there are expectations that certain elements of scene composition and content are present. These elements are modeled in a domain-independent way. For example, in a particular exemplary model, instead of "beach sand" being the model, the model is "extended horizontal strip of light, possibly yellowish, color near the middle of the image". In one or more embodiments, these models contain normative conditions, such as "horizontal", which have been statistically derived from a number of labeled examples. In the embodiment, the system attempts to find candidates for each of the specified elements and notes any anomalies with respect to their models. For example, the system may recognize that there is a colored region in the image that looks similar to the model, but is slightly diagonal instead of purely horizontal. Once this anomaly has been detected in the domain-independent model, the system re-characterizes the anomaly using a suitable domain-dependent terminology. For example, when the sand portion of a beach image appears diagonal, it is usually evidence for the presence of a "cove". Thus, the overall image may be given the textual description "a beach scene of a cove".

One or more embodiments provide for the advantage that a small set of domain-independent model types can potentially cover all images the system might encounter. For instance, 3D "blobs", 2D "surfaces", and 1D "tubes" are sufficient for nearly all visual objects. This is in contrast to specialized representations such as "endocardial wall" for a computed tomography (CT) scan of a heart and "red blood cell" for peripheral blood smears.

In one or more embodiments, it may be advantageous to describe an image as some base class plus deviations from the base class. In the medical domain such a description may be particularly useful since, while not all anomalies are pathologies, generally pathologies give rise to anomalies. For example, detecting that a lung has a 3D blob having a "rounded corner" (a domain-independent characterization) on a distal margin rather than being sharp, can be used to infer that there is fluid accumulation in the costophrenic angle (a domain-dependent characterization). Similarly, a wrong texture, color, or count (all domain-independent characterizations) of some element often has diagnostic ramifications. In one or more embodiments, detecting such conditions in a domain-independent manner as a first pass saves the time and effort needed to build a much larger number of more specialized detectors which would otherwise be required.

In an embodiment, an application receives an input image and applies a set of domain-specific classifiers to determine a broad domain classification of the image. In the embodiment, the application selects a number of domain-independent element models based upon the classification result. In the embodiment, the application attempts to segment elements in the input image corresponding to these models, and examines the found elements to determine domain-independent anomalies or deviations of the elements from the domain-independent models. In one or more embodiments, an element is a feature found within the image having an expected appearance, position, size and/or shape. For example, an element may include an expected appearance, position, size, and/or shape of a body organ. In one or more embodiments, a statistical anomaly may include a deviation from the expected appearance position, size, and/or shape of the element by more than a determined amount.

In the embodiment, the application generates a domain-independent anomaly description which describes characteristics of the anomaly in a domain-independent manner. In the embodiment, the application translates or re-characterizes the domain-independent anomaly description into a domain-specific textual description of the anomaly including domain-specific terms. In the embodiment, the application generates an output text description representative of the domain-specific textual description. In one or more embodiments, the domain-specific textual description may include a position of the anomaly such as one or more of an identification of a region near a landmark of a body organ (e.g., "apex" of a lung), portions of a contour (e.g., "costophrenic angle"), or overall anatomical coordinates (e.g., "left", "distal") of the anomaly.

In one or more embodiments, groundings for many visual characteristics can be learned. For example, general appearance terms such as "dark", "cloudy", and "striated" can be learned. In another example, geometric terms such as "swollen", "narrowed", and "enlarged" may be learned.

In particular embodiments, the initial classification of an image using the domain-specific classifier does not necessarily need to be performed on the basis of the appearance of the image itself. In one or more embodiments, the initial classification can be based on alternate information, additional information, or metadata associated with an image instead of or in addition to the image data. For example, text of a question containing an image may state "A fetal ultrasound was taken to confirm". In this example, the application can directly infer the basic nature of the image from the text alone. In another example, suppose that the image was found to reside on a disk of an X-ray machine in a podiatrist's office. The application can infer that such information is strong evidence that the class of the image being examined is "X-ray of a foot".

The illustrative embodiments are described with respect to certain types of image data, classifiers, models, domains, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
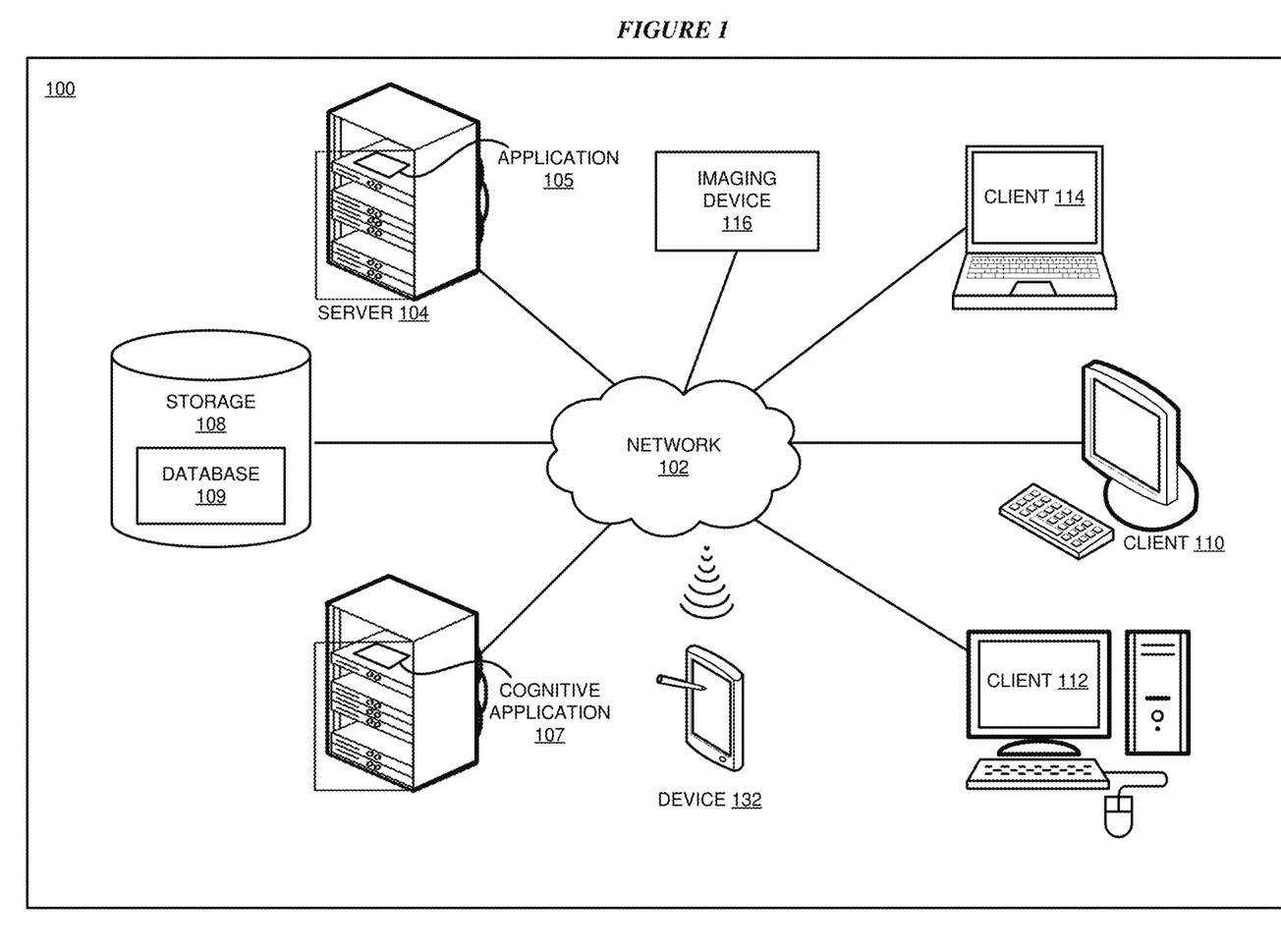
FIG. 1 depicts a block diagram of a network of data processing systems in which illustrative embodiments may be implemented.
Figure 2:
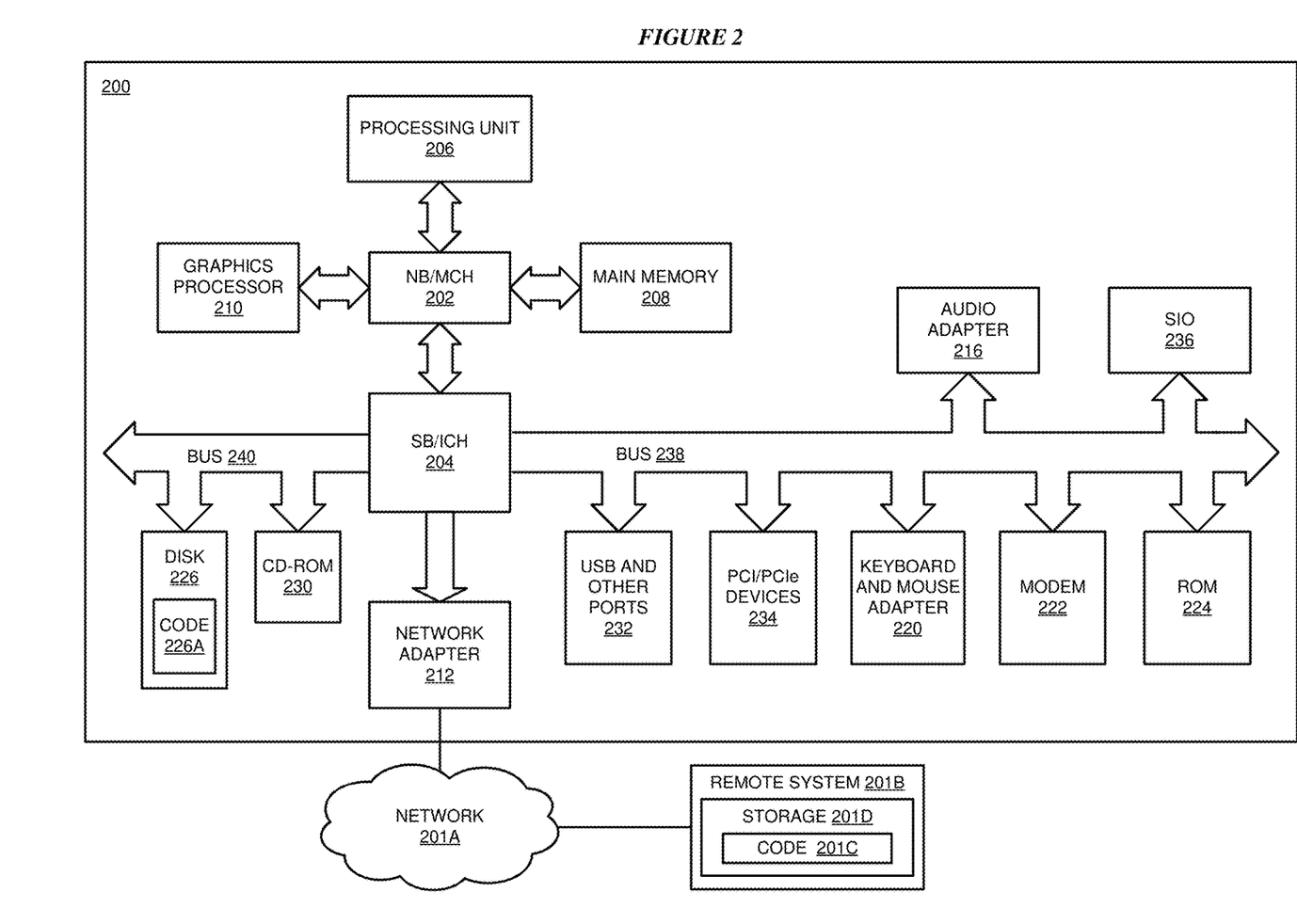
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. In one or more embodiments, storage 108 may be configured to store one or more models, domain-specific classifiers, domain-independent element models, domain-independent anomaly descriptions, domain-specific anomaly descriptions, and/or element descriptions within a database 109. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a PDA, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 of server 104 implements an embodiment of a process for generating a textual description of an image using domain-independent anomaly analysis as described herein. Cognitive application 107 of server 106 implements a cognitive reasoning system as described herein with respect to various embodiments. Imaging device 116 is configured to capture image data representative of a subject or object, such as a body part, for which a textual description is desired to be generated. In particular embodiments, imaging device 116 may include a camera, an x-ray machine, a scanner, or any other suitable imaging device. In other embodiments, imaging device 116 may be omitted and the image data may be obtained from another suitable source.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein in which computer usable program code or instructions implementing the processes of the illustrative embodiments may be located. Data processing system 200 is described as a computer only as an example, without being limited thereto. Implementations in the form of other devices may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as cognitive application 105 and document authoring application 107 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
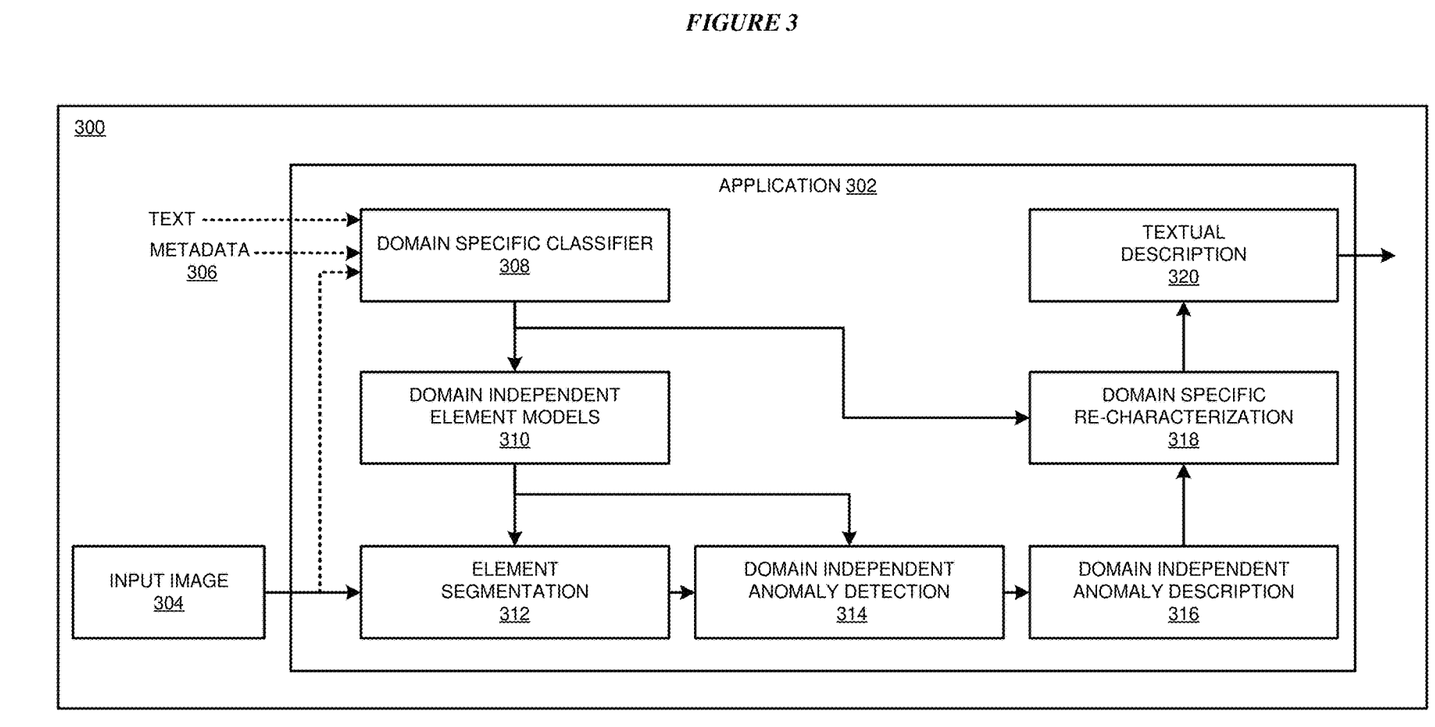
FIG. 3 depicts a block diagram of an example configuration of an application for generating a textual description of an image using domain-independent anomaly analysis in accordance with an illustrative embodiment.

With reference to FIG. 3, this figure depicts a block diagram of an example configuration of an application 302 for generating a textual description of an image using domain-independent anomaly analysis in accordance with an illustrative embodiment. Application 302 is an example of application 105 in FIG. 1. Application 302 includes a domain-specific classifier component 308 configured to receive an input image 304, and text and/or metadata 306. Input image 304 is an image containing one or more features or elements for which a domain-specific textual description of the one or more features or elements is desired. Text and/or metadata 306 includes text, metadata, or other additional information indicative of a context of input image 304 such as modality or viewpoint of input image 304. In a particular embodiment, the modality of the image includes a type of imaging equipment used to acquire structural or functional images of a portion of a body including, but not limited to, radiography, ultrasound, nuclear medicine, computed tomography (CT), magnetic resonance imaging (MRI) and visible light.

Domain-specific classifier component 308 is configured to apply a set of one or more domain-specific classifiers to determine a broad domain classification of input image 304 based upon input image 304 and text and/or metadata 306. In the embodiment, a domain-independent element models component 310 is configured to select one or more of domain-independent element models based upon the classification result. The one or more domain-independent element models include models of elements or features that may be found in input image 304. In the embodiment, an element segmentation component 312 attempts to segment elements in input image 304 corresponding to the one or more domain-independent element models. In one or more embodiments, an element is a feature found within the image having an expected appearance, position, size and/or shape. For example, an element may include an expected appearance, position, size, and/or shape of a body organ. A domain-independent anomaly detection component 314 is configured to examine the segmented elements to determine/detect domain-independent statistical anomalies or deviations of the segmented elements from the domain-independent models. In one or more embodiments, a statistical anomaly may include a deviation from the expected position, size, and/or shape of the element by more than an expected or acceptable amount.

In the embodiment, a domain-independent anomaly description component 316 generates a domain-independent anomaly description which describes characteristics of the statistical anomaly in a domain-independent manner. In a particular embodiment, the domain-independent anomaly description includes a textual description of the anomaly using terms that are not specific to a particular domain.

In the embodiment, a domain-specific re-characterization component 318 translates or re-characterizes the domain-independent anomaly description into a domain-specific textual description of the statistical anomaly including terms specific to the determined specific domain to describe the statistical anomaly. In the embodiment, a textual description component 320 generates an output textual description that representative of the domain-specific textual description using domain-specific terms to describe the statistical anomaly.

Figure 4:
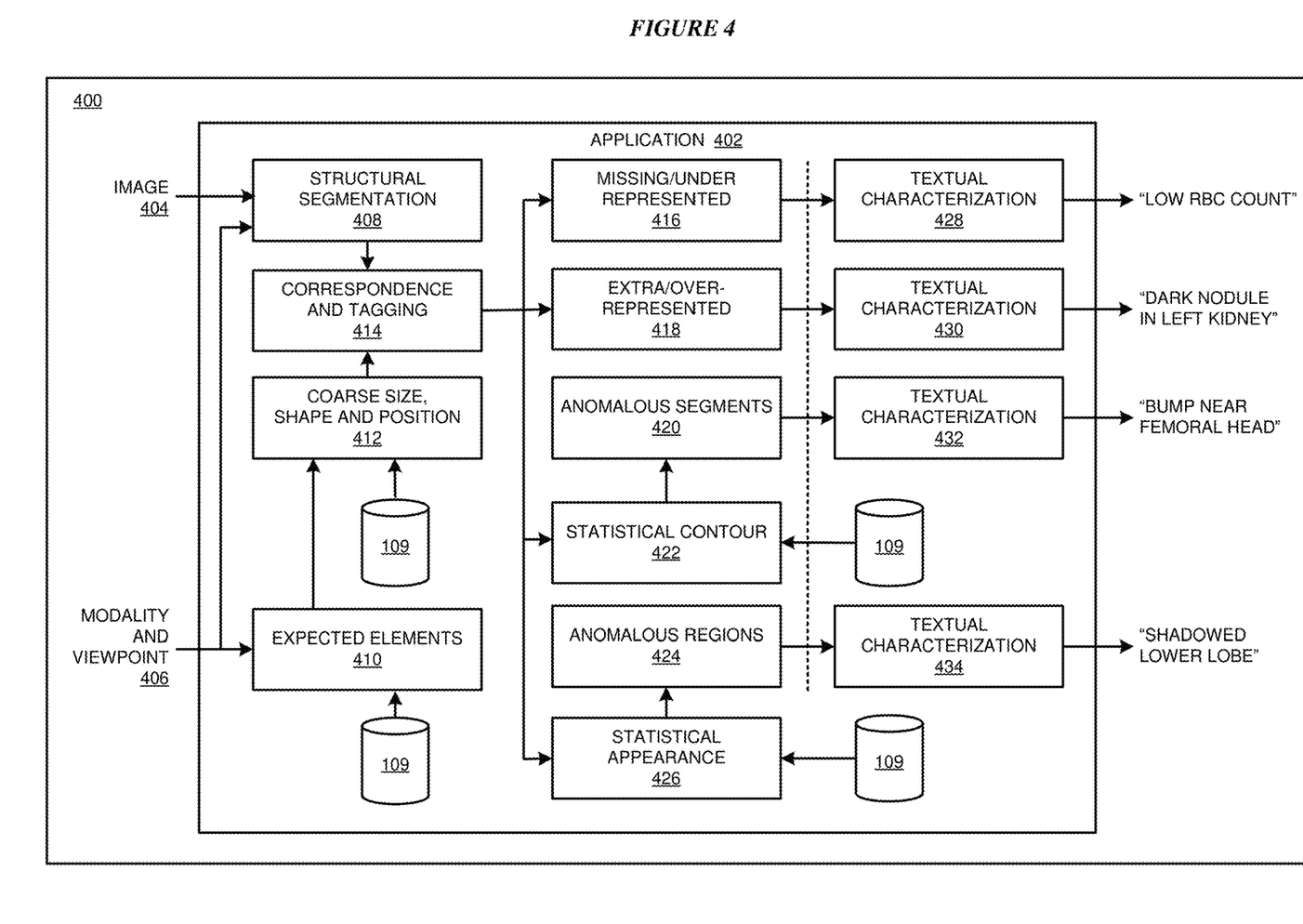
FIG. 4 depicts a block diagram of an example configuration of an application for generating a textual description of a medical image using domain-independent anomaly analysis in accordance with another illustrative embodiment.

With reference to FIG. 4, this figure depicts a block diagram of an example configuration of an application 402 for generating a textual description of a medical image using domain-independent anomaly analysis in accordance with another illustrative embodiment. In the embodiment, application 402 is configured to perform operations related to medical image interpretation to identify anomalous regions or portions of body parts in a medical image.

In the embodiment, application 402 receives an image 404 and modality and viewpoint information 406. In a particular embodiment, modality and viewpoint information 406 are received as an output from a domain-specific classifier such as domain specific classifier 308 of FIG. 3. In particular embodiments, for medical images, modality and viewpoint information 406 generally consists of several parts of classification information. In the particular embodiment, one classification information part is a type of radiology or imagery used, such as X-ray, CT, positron emission tomography (PET), MRI, microscopy, etc. Another part of the classification information is a portion of the anatomy within image 404, such as a foot, a heart, kidneys, a brain, etc. Another part of the classification information is the imaging direction used. For example, chest X-rays can be either taken in a front-to-back direction ("anterior-posterior" or "AP") with the patient lying on a table, or from a side ("lateral") direction with the patient standing up. The elements visible in these two viewpoints are sometimes different, as are their expected appearances (position, shape, texture, etc.).

In the embodiment, expected elements 410 in image 404 are looked up in a semantic database within database 109 based on modality and viewpoint information 406. For instance, for an AP chest X-ray one would expect to see the left lung, the right lung, the heart, the diaphragm, and the clavicle bones. These elements are expected to have particular coarse characterizations 412 including a coarse appearance, size, shape, and/or position. For instance, the left lung shows up on the right side of an AP X-ray, is a large vertically elongated region, dark in coloration, and about half the height of the image. Similar coarse characterizations exist that are looked up from a graphical database within database 109 for the other expected elements. Input image 404 is subdivided into likely regions based on overt appearance using structural segmentation 408 to form candidate regions. In the embodiment, the candidate regions are matched to the coarse description to develop a correspondence and tagging 414 between the expected elements names and the image regions.

In an alternative embodiment, instead of a coarse graphical description, a more detailed model such as an Active Shape Model (ASM) or Active Appearance Model (AAM) may be retrieved for each expected element, and the associated more sophisticated segmentation method is applied to the input image to locate each element. It should be understood that the methods described herein such as ASM and AAM are not specific to the medical domain, but can be used with objects of many different types (e.g. airplanes, cars, and horses).

In the embodiment, the partially segmented image is examined in a domain-independent manner to find anomalies. In a particular embodiment, a comparison is made to make sure that of all the expected elements are present, and in the right quantities, to determine whether the expected elements are missing/underrepresented 416. For Instance, if the right lung cannot be found, it may be the case that it has collapsed and hence its absence should be noted. Similarly, if a distinct object is found (e.g. a bullet) which was not a member of the list of expected elements, this extra/over-represented element 418 also should be recorded. For some types of images, mere presence or absence is not enough, and it is rather the expected number of some type of element that is important. For example, in the case of peripheral blood smear microscopy images and red blood cells—one should see N of these elements for every M other elements (e.g. white blood cells). In a particular example, a domain-independent textual description of such anomalies may include "missing element 2" or "excess number of element 7".

In the embodiment, a more detailed analysis of the image elements also examines the shape and texture of the elements. In the embodiment, statistical models are retrieved from database 109 for the associated image elements to identify a statistical contour 422 of an element and identify anomalous segments 420 of the element. In an embodiment, application 402 compares each element using a contour-based shape model. In another embodiment, application 402 compares each element using a texture-based interior model. In the embodiment, statistical appearance models further retrieved from database 109 to identify a statistical appearance 426 of the element to determine anomalous regions 424 of the statistical appearance 426. In particular embodiments, the statistical models are learned by taking average appearance and likelihood of various modes of variations across the appropriate element(s) in a number of "healthy" example images of the same type. An anomaly might be flagged, for example, when the variation detected was more than two standard deviations away from the mean of the collection. Or, in a more sophisticated analysis, an anomaly may be declared when the likelihood of the observed variation is less than one percent (1%) in the principle component analysis (PCA) decomposition of the training examples. Example initial domain-independent descriptions of these types of anomalies may include "excess curvature on border segment 12" or "insufficiently striated texture in region 8". Overall characterizations such as "element 4 too big" or "element 23 mottled texture instead of clear" are also possible in certain embodiments.

Application 402 is further configured to convert the domain-independent anomaly descriptions into domain-dependent text. For instance, if too few dimpled circular structures were found in a peripheral blood smear, this could be translated into the medically relevant text string "low RBC" as a domain-specific textual characterization 428 of missing/under represented element 416 as indicative of a low red blood cell (RBC) count. Similarly, if an unexpected dark colored element showed up within an ovoid structure in a CT image (Computed Tomography) of the abdomen, this observation could be converted to the phrase "dark nodule in left kidney" as domain-specific textual characterization 430 of extra/over represented element 418.

Anomalies in contour shape and interior appearance can also be converted to more meaningful forms. For instance, if a section of contour for some object bulged outwards at some position, this anomaly is first translated to the domain-independent term "bulge in section 45 of contour of element 6". Then, because of the known identity of the element with aberrant contour and the location of the aberration, the unexpected find in a leg X-ray could be rendered as "bump near the femoral head" as a domain-specific textual characterization 432 of anomalous segments element 422. In another example, a section of a large oval object is found as being darker than expected in a chest X-ray. Because of the known identity of the containing element and the location of the anomaly within this element, the description can be converted from merely "dark region in element 9" to "shadowed lower lobe" as a domain-specific textual characterization 434 of anomalous regions element 424. In one or more embodiments, such domain-specific textual descriptions translate not only the category of the anomaly into some specific term, but also provide the relevant anatomical location of the anomaly.

One or more embodiments rely on the use of domain-independent element models and domain-independent methods for detection of anomalies in elements determined from an input image. In one or more embodiments, most items of interest can be modeled as one or more of three types: surfaces (largely two-dimensional), tubes (largely one-dimensional), and objects or blobs (largely three-dimensional). In particular embodiments, specific types of measurements are associated with each of these types and, based on the nature of the measurement, processes for finding anomalies.

Figure 5A:
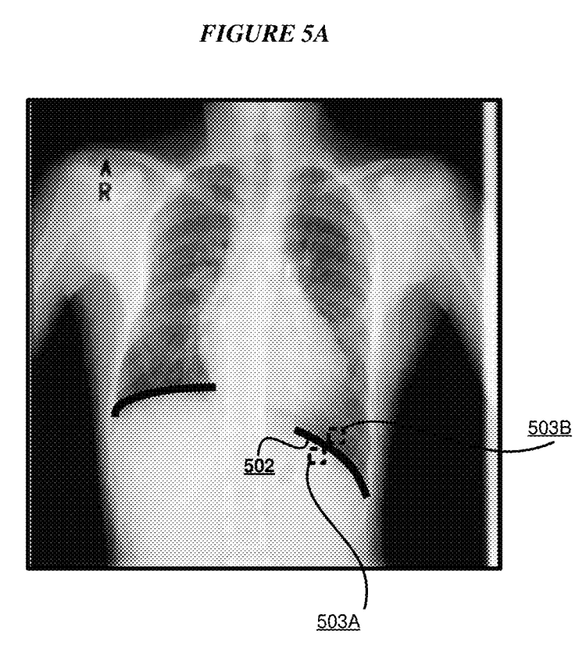
FIGS. 5A-5B depict an example of a medical image analysis surface primitive in accordance with an illustrative embodiment.
Figure 5B:
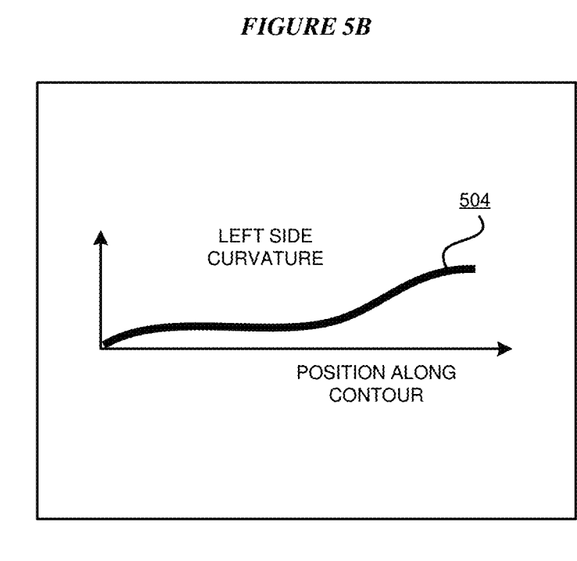

Referring now to FIGS. 5A-5B, these figures depict an example of a medical image analysis surface primitive in accordance with an illustrative embodiment. FIG. 5A depicts an example of a surface primitive including a diaphragm of an AP chest X-ray. A basic measurement for the surface primitive is its pattern of curvature 502, e.g. it is straight to begin with then curves sharply downward. In an embodiment, left side pattern of curvature 502 is not represented by words, but rather by a graph of values 504 as shown in FIG. 5B. In the example surface primitive of a diaphragm, the curvature pattern may be characterized by starting at one end and shifting along the contour for best alignment. In an embodiment, a collection of such graphs from healthy individuals defines a "band of normalcy". In the embodiment, portions of a test diaphragm contour derived from an input image that fall outside the band are deemed anomalous.

In other embodiments, curvature is not the only characteristic that can be evaluated for a surface. Another possibility is to look at image patches 503A and 503B to either side of the contour to determine a texture of the diaphragm. In particular embodiments, image patches 503A and 503B can be represented by their average grayscale value, standard deviation in intensity, and distribution of edge directions. Again, a statistical analysis can be performed on patches 503A and 503B (or the difference in patches across the surface) to provide a quantified definition of "normal".

In some embodiments, "normal" does not have to be defined solely with regard to other individuals. Many anatomical structures come in pairs, both of which are visible in the same image. Thus, the left side of the diaphragm may look flattened compared to the whole image collection, but it is similar in curvature to the right side of the diaphragm seen in this same image. Hence, although somewhat unusual, it would not necessarily be flagged as an anomaly. In another example, the relative position of the diaphragm may be checked with respect to a landmark.

Figure 6A:
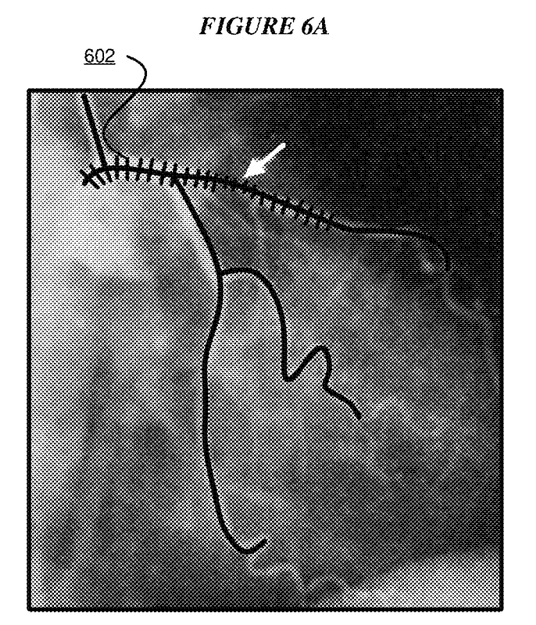
FIGS. 6A-6B depict an example of a medical image analysis tube primitive in accordance with an illustrative embodiment.
Figure 6B:
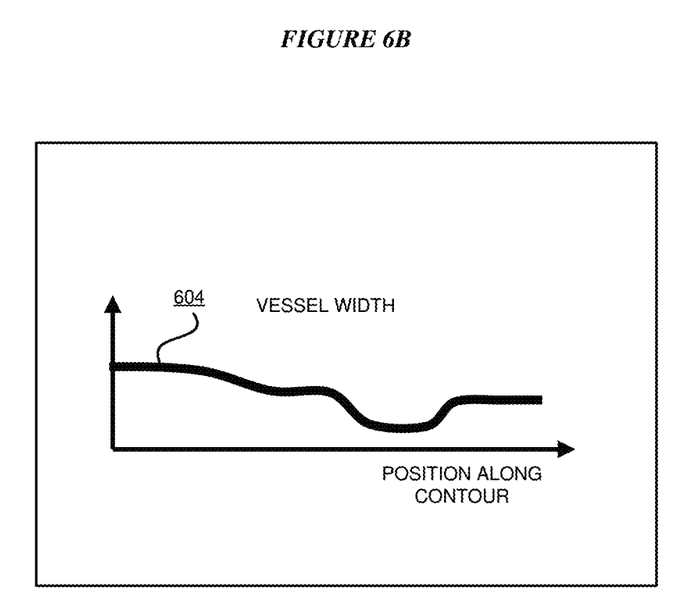

Referring now to FIGS. 6A-6B, these figures depict an example of a medical image analysis tube primitive in accordance with an illustrative embodiment. FIG. 6A depicts an example of a tube primitive including a blood vessel 602. In one or more embodiments, a tube primitive is a linearly extended item. Tubes in general have a direction, which can vary along their length just as the curvature of a surface can vary. Perhaps more interestingly, tubes have a characteristic width which changes along an axis of symmetry. Accordingly, a measurement for the tube primitive is a vessel width. FIG. 6B depicts a graph of a vessel width variation 604 along a counter of blood vessel 602. The graph of vessel width variation 604 can be compared with similar graphs obtained from healthy individuals to highlight anomalies. For instance, an unusual narrowing in a coronary artery is a sign of atherosclerosis, and thus is an important aspect to render into a domain-specific textual description of the anomaly. Another anomaly that may be identified is an inhomogeneous texture which may indicate, for example, a bone fracture. Other anomalies may be identified using an axial shape or relative position such as looking for kinks, stretching, or branching of the tube. Still other anomalies may be identified by looking for deflections with respect to landmarks.

Figure 7A:
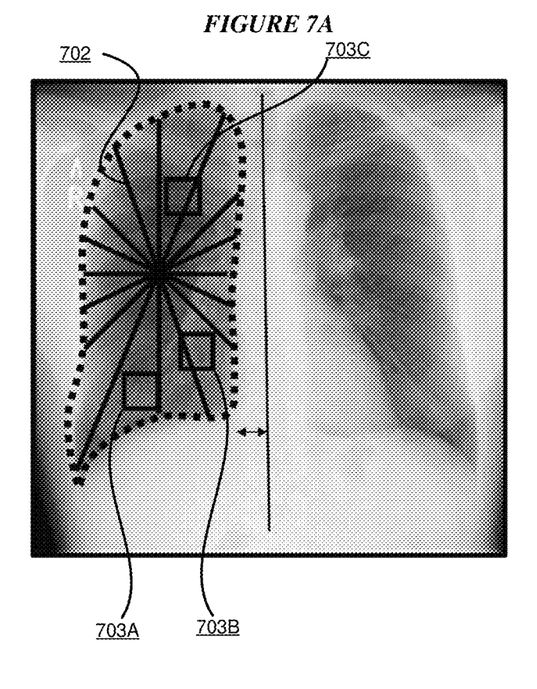
FIGS. 7A-7B depict an example of a medical image analysis solid three dimensional (3D) object primitive in accordance with an illustrative embodiment.
Figure 7B:
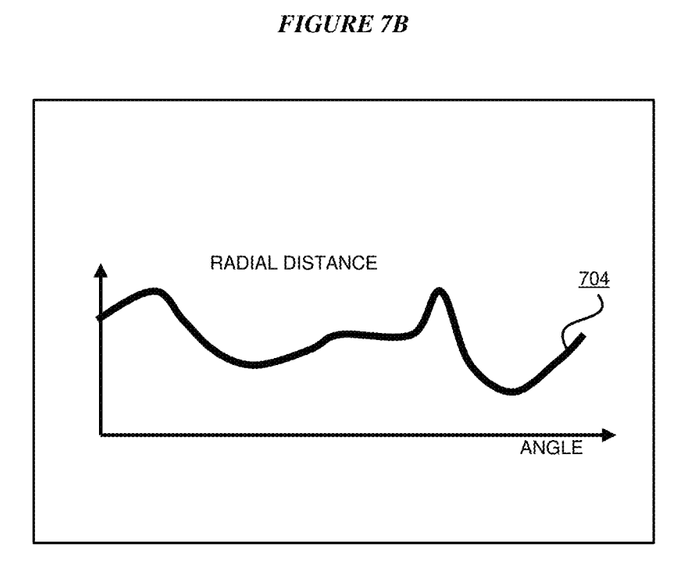

Referring now to FIGS. 7A-7B, these figures depict an example of a medical image analysis solid three dimensional (3D) object primitive in accordance with an illustrative embodiment. FIG. 7A depicts an example of a 3D object primitive of a lung. Similar to a surface primitive, the 3D object primitive has a contour with a curvature that can be graphed as a function of position relative to some starting reference point. Similar to a tube, the 3D object primitive has a width that can be graphed, perhaps as a function of radial angle from the object centroid instead of axial tube position. FIG. 7A shows a radial 702 of the 3D object primitive of the lung. FIG. 7B shows a graph plotting a radial distance 704 from a centroid of the 3D object primitive of FIG. 7A that can be used to develop a statistical model of the population and thus provide a guide to normal versus anomalous shapes.

In addition to a boundary, an object also has an interior area whose appearance can be characterized in a number of ways. In particular embodiments, small images patches 703A-703C can be described by their intensity distributions and responses to convolution texture kernels. Moreover, the local position of each patch 703A-703C is known so regional characterization of the expected appearance can also be developed. That is, just because a particular patch is darker than the average of all patches extracted from the lung, it is not necessarily anomalous. If a patch came from near the center, the patch would be expected to be darker given such a regional model.

Also, as described for the surface primitives, comparisons can be performed between corresponding contra-lateral elements instead of just aggregate models derived from a multitude of other individuals. In the case of lungs, for instance, the distance between the interior boundary and the spinal center might look to be within normal limits on both sides. However, if one lung was markedly closer to this line than the other, this might well be an anomaly worth noting.

While the examples given have largely been from the medical domain, the method may be used with other types of images. Consider an image initially classified as a "beach scene" (whether by appearance, associated text, or other means). Given this category it is expected to find a light colored band at the bottom ("sand") of the image, a dark blue band near the middle ("ocean") of the image, and a light blue area above the middle ("sky"). As previously discussed, a deviation in the sand portion can lead to a pictorial description of "cove" instead. Supposing that the sand region usually has flecks of bright color in it (blankets and umbrellas), if these flecks are missing, then the description would become "empty beach" (not just "missing flecks"). Similarly, the sky region might be expected to have a few amorphous whitish blobs in it ("clouds"). If there are too many of these whitish blobs compared to the statistical average for the category, the overall description might be altered to "stormy beach" (not just "too many white blobs"). Finally, the sky region might typically show a yellowish circular element ("sun"). If the yellowish circular element is present, but the wrong color of green, the textual description "beach scene with a green sun" (as opposed to "wrong color element in top region") is generated.

Figure 8:
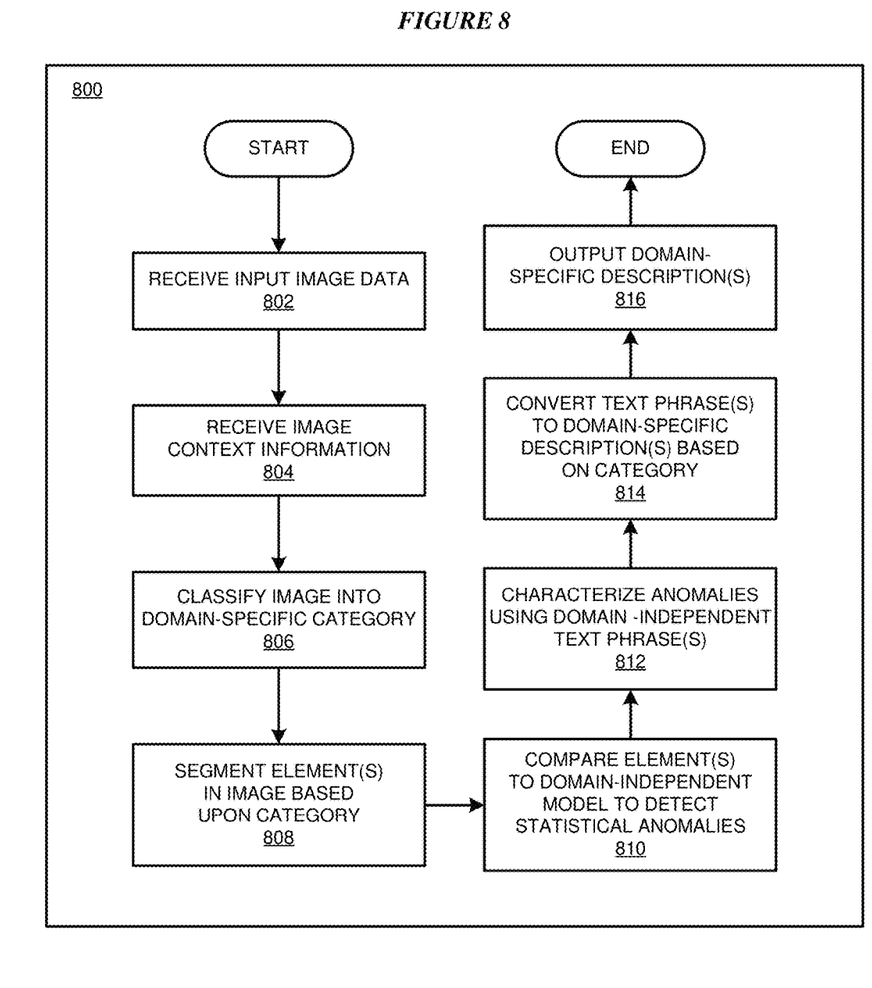
FIG. 8 depicts a flowchart of an example process for generating a textual description of an image using domain-independent anomaly analysis in accordance with an illustrative embodiment.

With reference to FIG. 8, this figure depicts a flowchart of an example process 800 for generating a textual description of an image using domain-independent anomaly analysis in accordance with an illustrative embodiment. In one or more embodiments, process 800 can be implemented in application 105. In other embodiments, process 800 can be implemented in client device 110 or device 132.

In block 802, application 105 receives input image data containing one or more features or elements for which a domain-specific textual description of the one or more features or elements is desired. In block 804, application 105 receives context information indicative of a context of the input image data. In particular embodiments, the context information includes text and/or metadata associated with the input image data. In particular embodiments, the context of the input image data includes a modality and viewpoint of the input image data.

In block 806, application 105 classifies the overall image represented by the input image data into a domain-specific category based upon the context information. In block 808, application 105 segments one or more elements in the image based on the domain-specific category. In a particular embodiment, segmenting the one or more elements uses a segmenting procedure specific to the domain-specific category. In another particular embodiment, segmenting the one or more elements uses a segmenting procedure specific to the element. In another embodiment, segmenting the one or more elements aligns a generically segmented element with a coarse model associated with the category.

In block 810, application 105 compares each element of the one or more elements to a domain-independent model to detect statistical anomalies in the one or more elements. In an embodiment, application 105 compares each element using a contour-based shape model. In another embodiment, application 105 compares each element using a texture-based interior model.

In block 812, application 105 characterizes the detected statistical anomalies using one or more domain-independent text phrases. In an embodiment, characterizing the detected statistical anomalies includes noting missing or under-represented elements. In an embodiment, characterizing the detected statistical anomalies includes noting extra or over-represented elements.

In block 814, application 105 converts the one or more domain-independent text phrases to one or more domain-specific descriptions based upon the domain-specific category. In block 816, application 105 outputs the one or more domain-specific descriptions. Process 800 is ended thereafter.

Thus, a computer implemented method, system or apparatus, and computer program product are provided in the illustrative embodiments for generating a textual description of an image using domain-independent anomaly analysis and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for generating a textual description of an image comprising:
    classifying an image represented by image data into a domain-specific category;
    segmenting one or more elements in the image data based on the domain-specific category;
    comparing each element of the one or more elements to a domain-independent model to detect one or more statistical anomalies in the one or more elements,
    wherein the comparing includes retrieving a statistical model from a database, and identifying a variation in the image by examining at least a portion of the image data based on the statistical model retrieved from the database;
    characterizing the one or more detected statistical anomalies using one or more domain-independent text phrases; and
    converting the one or more domain-independent text phrases to one or more domain-specific descriptions based upon the domain-specific category.

2. The method of claim 1, further comprising:
outputting the one or more domain-specific descriptions.

3. The method of claim 1, further comprising:
receiving the image data; and
receiving context information indicative of a context of the image data, wherein the classifying of the image into the domain-specific category is based upon the context information.

4. The method of claim 3, wherein the context information includes metadata associated with the image data.

5. The method of claim 3, wherein the context includes a modality and viewpoint of the image data.

6. The method of claim 1, wherein segmenting the one or more elements uses a segmenting procedure specific to the domain-specific category.

7. The method of claim 1, wherein segmenting the one or more elements uses a segmenting procedure specific to the element.

8. The method of claim 1, wherein segmenting the one or more elements aligns a generically segmented element with a coarse model associated with the domain-specific category.

9. The method of claim 1, wherein the domain-independent model is a contour-based shape model.

10. The method of claim 1, wherein the domain-independent model is a texture-based interior model.

11. The method of claim 1, wherein characterizing the detected statistical anomalies includes noting missing or under-represented elements.

12. The method of claim 1, wherein characterizing the detected statistical anomalies includes noting extra or over-represented elements.

13. A computer usable program product comprising one or more computer-readable storage devices, and program instructions stored on at least one of the one or more storage devices, the stored program instructions comprising:
    program instructions to classify an image represented by image data into a domain-specific category;
    program instructions to segment one or more elements in the image data based on the domain-specific category;
    program instructions to compare each element of the one or more elements to a domain-independent model to detect one or more statistical anomalies in the one or more elements,
    wherein the program instructions to compare include program instructions to retrieve a statistical model from a database, and program instructions to identify a variation in the image by examining at least a portion of the image data based on the statistical model retrieved from the database;
    program instructions to characterize the one or more detected statistical anomalies using one or more domain-independent text phrases; and
    program instructions to convert the one or more domain-independent text phrases to one or more domain-specific descriptions based upon the domain-specific category.

14. The computer usable program product of claim 13, further comprising:
    program instructions to output the one or more domain-specific descriptions.

15. The computer usable program product of claim 13, further comprising:
   program instructions to receive the image data; and
   program instructions to receive context information indicative of a context of the image data, wherein the classifying of the image into the domain-specific category is based upon the context information.

16. The computer usable program product of claim 15, wherein the context information includes metadata associated with the image data.

17. The computer usable program product of claim 15, wherein the context includes a modality and viewpoint of the image data.

18. The computer usable program product of claim 13, wherein the computer usable code is stored in a computer readable storage device in a data processing system, and wherein the computer usable code is transferred over a network from a remote data processing system.

19. The computer usable program product of claim 13, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
   program instructions to classify an image represented by image data into a domain-specific category;
   program instructions to segment one or more elements in the image data based on the domain-specific category;
   program instructions to compare each element of the one or more elements to a domain-independent model to detect one or more statistical anomalies in the one or more elements,
   wherein the program instructions to compare include program instructions to retrieve a statistical model from a database, and program instructions to identify a variation in the image by examining at least a portion of the image data based on the statistical model retrieved from the database;
   program instructions to characterize the one or more detected statistical anomalies using one or more domain-independent text phrases; and
   program instructions to convert the one or more domain-independent text phrases to one or more domain-specific descriptions based upon the domain-specific category.

\* \* \* \* \*